United States Patent [19]

Dorner et al.

[11] Patent Number: 4,527,759
[45] Date of Patent: Jul. 9, 1985

[54] UNITARY CLIP FOR RETAINING CONTROL LINES ON A FLANGE

[75] Inventors: Karlheinz Dorner, Bergisch Gladbach; Kurt Mohrholz, Rösrath-Forsbach, both of Fed. Rep. of Germany

[73] Assignee: Ford Motor Company, Dearborn, Mich.

[21] Appl. No.: 502,813

[22] Filed: Jun. 9, 1983

[30] Foreign Application Priority Data

Jun. 25, 1982 [DE] Fed. Rep. of Germany ....... 3223751

[51] Int. Cl.$^3$ .............................................. F16L 3/08
[52] U.S. Cl. ..................... 248/73; 248/68.1; 248/74.2
[58] Field of Search ............ 248/73, 74.5, 74.3, 248/74.2, 68.1; 24/546, 563, 533, 532, 458, 457, 459, 482, 483, 484, 564, 531

[56] References Cited

U.S. PATENT DOCUMENTS

| | | | |
|---|---|---|---|
| 461,143 | 10/1891 | Randall | 24/546 X |
| 2,666,968 | 1/1954 | Bedford | 24/458 X |
| 2,724,882 | 11/1955 | Poupitch | 24/458 X |
| 2,928,637 | 3/1960 | Jansson | 248/68.1 |
| 3,074,675 | 1/1963 | Brown | 248/74.3 |
| 3,228,640 | 1/1966 | Wolsh | 248/74.3 X |
| 3,288,506 | 11/1966 | Cline | 24/563 X |
| 4,083,523 | 4/1978 | Fisher | 248/74.3 |
| 4,306,697 | 12/1981 | Mathews | 248/68.1 |
| 4,375,879 | 3/1983 | Kojima | 248/74.1 X |

FOREIGN PATENT DOCUMENTS

| | | | |
|---|---|---|---|
| 2454012 | 7/1980 | France | 248/74.3 |
| 2092216 | 8/1982 | United Kingdom | 248/74.5 |

Primary Examiner—J. Franklin Foss
Attorney, Agent, or Firm—Paul K. Godwin, Jr.; Robert D. Sanborn

[57] ABSTRACT

A self-locking clip for mounting control lines such as wires, cables and the like on a flange, is formed of a single piece spring metal or of a resilient plastic material. The clip has an open-ended support channel that slightly overlaps the flange with a support and a holding section with upper and lower arms. The upper support arms hold the channel on the flange with a tab which extends over the corner defined between the plate and the flange. A biasing arm extends from the closed end of the support channel to contact the plate and cant the flange within the channel. A void area between the biasing arm and the plate beneath the flange is used to retain the control lines against the plate.

4 Claims, 3 Drawing Figures

UNITARY CLIP FOR RETAINING CONTROL LINES ON A FLANGE

BACKGROUND OF THE INVENTION

1. Field of the Invention

The present invention relates to the field of fastening clips and more specifically to the area of flange mounted clips used for retaining and supporting control lines on a flange.

2. Description of the Prior Art

Flange mounted clips in this field are numerous. Two of the general types are shown in German Pat. Nos. 7109857 and 7117427. In the case of the German Pat. No. 7109857, the fastening clip is shown as a unitary plastic part formed to be attached to a corner shaped flange. The clip is illustrated as having a cantilevered spring which is intended to extend well over the corner to contact the plate and compress the clip against both the outer edge of the flange and the opposite side of the plate from which the flange is formed. In the case of the German Pat. No. 7117427, the mounting clip is shown as a spring steel element which includes a locking spring that extends over the corner formed between the plate and the flange to keep the clip in place, on the flange.

Each of these prior art clips discussed above, have a common disadvantage in that the holding portions of the clip, used to lock the clip on the flange, extend past the flange corner beyond the plane of the plate used to form the flange.

In automotive vehicles, the structural plate or sheet material that forms the inner portion of the doors is usually covered with a flush mounted decorative panel. When the panel is mounted directly against the outer face of the plate from which a flange is formed, clips that extend beyond the corner, formed between the flange and the plate, would interfere with the desired flush mounting of the decorative panel. Therefore, such prior art clips are not useable in those applications.

SUMMARY OF THE INVENTION

The present invention is an improved clip for mounting wires, cables and the like on flanges and provides compressive locking of the clip to the flange and a retaining tab that lies substantially coplanar with the other plate surface. The clip is made of a single piece of resilient material and defines an open-ended support channel formed to be slid onto a flange edge. The upper open end of the support channel is formed to define a small tab that is inwardly directed with respect to the channel and serves to catch the corner formed between the flange and the plate when the support channel is slid onto the flange. A cantilevered spring arm is formed to extend from the closed end of the support channel to a point that is in contact with the underside of the plate, below the flange, to provide a biasing effect that reinforces the function of the tab on the support channel to catch the corner and lock the clip on the flange. The cantilevered spring arm defines a void area between itself and the underside of the plate, through which control lines, such as electrical wires, actuation cables or fiber optic bundles may pass. The clip, of course, serves to support and retain the control lines and also to protect them from vibrational chafing by securing them against the panel. Additional compression and clamping of the control lines may be achieved by utilizing a plurality of retrorse fins on the underside of the cantilevered spring arm.

BRIEF DESCRIPTION OF THE INVENTION

The invention is further clarified with the help of the two embodiments shown in the accompanying drawings.

DETAILED DESCRIPTION OF THE PREFERRED EMBODIMENTS

In the figures, a sheet panel 1, such as may be used in an inner door assembly of a vehicle, is shown with a flange 2 formed thereon by being bent inwardly. The flange width is subject to considerably tolerance variations depending upon the machining conditions associated with the formation of the panel 1 and the flange 2. The tolerance variation is indicated as the dimension X.

Figure 1:
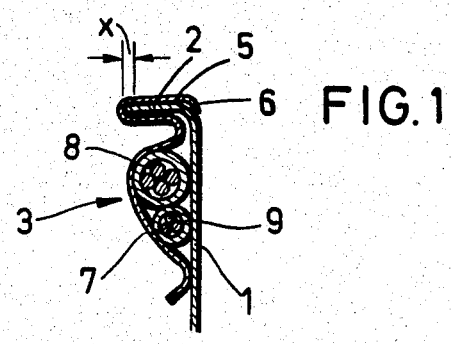
FIG. 1 shows a vertical section taken through a first embodiment of the invention formed of a unitary piece of spring sheet metal attached to a flanged panel.
Figure 2:
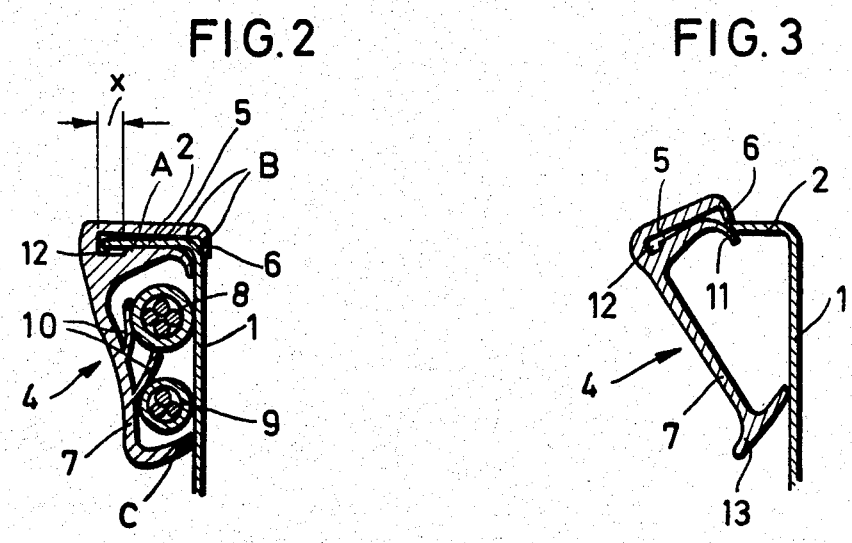
FIG. 2 is a vertical section through a second embodiment of the invention formed of a unitary piece of resilient plastic material shown mounted on a flanged panel.

Both the mounting clip 3, made of spring sheet steel shown in FIG. 1 and mounting clip 4 made of resilient plastic material, shown in FIG. 2, are embodiments of the invention and are formed to have an open-ended support channel 5. An upper support arm which serves to partially define the support channel 5 contains a tabbed end 6 that is formed to curve inwardly towards the channel. The clip in each embodiment shown also includes a cantilevered spring arm 7 that extends downward from the closed end of the support channel 5 to contact the underside of the panel 1 at a point C. The action of the cantilevered spring arm 7 against the underside of the panel 1 tends to cant the support channel 5 with respect to the flange 2 and provide a clamping action of the tab 6 against the corner formed between the panel 1 and the flange 2 at point B. The canting also causes contact at point A, between a lower arm that defines the remainder of the support channel 5 and the underside of the flange 2.

The cantilevered spring arm 7 also forms a void between itself and the back surface of panel 1, beneath the flange 2. Control lines, such as cables 8 and 9 are retained within the void. Depending upon the size of the cables 8 and 9, additional compression may be contributed to the clamping action to hold the clip onto the flange by appropriately selecting the clip size and corresponding void area. The clip may also be configured with retrorse fins 10 that compress the control lines 8 and 9 against the back surface of the panel 1.

The enlarged area 12 located at the closed end portion of the support channel 5 is shown in the embodiment of FIG. 2 to allow for any end burrs which may be present at the edge of the flange within the X area of tolerance.

Figure 3:
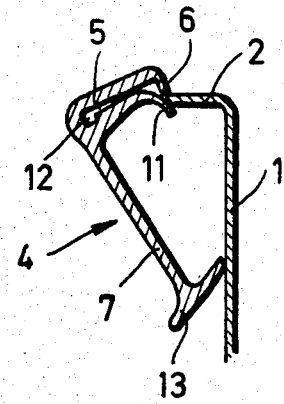
FIG. 3 is a vertical section of the second embodiment of the invention in a removed position with respect to a flanged panel.

In FIG. 3, the plastic clip 4 is shown in a removed position with respect to the flange 2. To facilitate assembly, a lower lip 11 located at the open end of the lower arm defining the support channel 5 extends below tab 6 to facilitate the insertion of the end of the flange 2 into the support channel 5. The clip 4 shown in FIG. 3 also illustrates a gripping tab 13 at the lower end of the cantileverd spring arm 7 which allows a technician to easily pull the end of the cantilevered spring arm 7 from the panel contact point C in order to introduce the control cables that need to be retained by the clip against the plate 1.

It will be apparent that many modifications and variations may be effected without departing from the scope of the novel concept of this invention. Therefore, it is intended by the appended claims to cover all such modifications and variations which fall within the true spirit and scope of the invention.

We claim:

1. A self-locking clip for retaining control lines between a mounting plate and a flange formed to extend from said plate comprising:

means defining an open-ended support channel for accepting the insertion of said flange, wherein one side of said channel is formed by an upper support arm having a tab element formed on the end thereof to curve towards said open end of said channel for contacting a corner formed between said flange and said plate; and means defining a biasing arm extending from said channel defining means for contacting the underside of said plate, when said flange is inserted, to cant said channel with respect to said flange and to force said tab against said corner and for defining a void between itself and the underside of said plate to retain said control lines.

2. A clip as in claim 1, wherein said biasing arm further includes at least one retrorse fin that extends into said void, for contacting control lines therein.

3. A clip as in claim 1, wherein said channel defining means further includes a lower support arm to define a second side of said channel and configured to have a curved surface at the open end of said channel that extends in the same direction as said tab so as to provide a guide surface for inserting said flange into said channel between said tab and said curved surface.

4. A clip as in claim 1, wherein said channel defining means provides an enlarged portion at the closed end defined at the junction between the upper and lower support arms to accept a burred edge of said flange without restriction.

* * * * *